Aug. 15, 1961 L. S. MAGOR 2,995,899
CONTROL DEVICE AND SYSTEM
Filed Feb. 1, 1960 4 Sheets-Sheet 1

INVENTOR :-
LINCOLN S. MAGOR
BY:- R L. Westell
PATENT AGENT

INVENTOR
LINCOLN S. MAGOR

BY: R.L. Westell
PATENT AGENT

FIG. 2

INVENTOR :-
LINCOLN S. MAGOR

BY :- R. L. Westell
PATENT AGENT

FIG. 2b   FIG. 2a

United States Patent Office 2,995,899
Patented Aug. 15, 1961

2,995,899
CONTROL DEVICE AND SYSTEM
Lincoln S. Magor, Galt, Ontario, Canada, assignor to Retor Developments Limited, Galt, Ontario, Canada, a corporation of Canada
Filed Feb. 1, 1960, Ser. No. 5,902
23 Claims. (Cl. 60—97)

This invention relates to an hydraulic control device and is particularly designed for use in the type of machine tool where it is desired to control longitudinal and crossfeeding movement of a cutter and a workpiece, whereby the workpiece may be caused to move in any direction in a plane relative to the workpiece.

By "hydraulically actuable elements" or "hydraulically actuable member" I mean devices which are actuated by hydraulic fluid under pressure to produce movement in rotary or translatory form and the phrases therefore include the ordinary hydraulic piston cylinder, including piston and shaft and also the hydraulic motor.

It is known that hydraulic control may be used to control the movement of a body, such as workpiece table, in a plane. Two hydraulically actuable devices such as cylinders or hydraulic motors each control the movement of the body in a dimension and are each provided with a pair of hydraulic lines. The direction of movement of the body in a dimension is determined by which hydraulic line is used as the supply and which as the exhaust line. Thus the hydraulic devices may be independently controlled as to sense and speed to move the body in any direction in a plane. The cylinders or motors are controlled by the rate and direction of hydraulic fluid supply.

Heretofore the fluid supplies for the two cylinders or motors have been hydraulically independent although simultaneously controlled. This hydraulic arrangement has been found to cause irregularities and errors in the movement of the member particularly at times when the body is moving in one direction under the impulsion of one cylinder or motor while stationary relative to the other cylinder or motor direction, that is, at the instant of reversal of direction in the other cylinder or motor.

It is an object of this invention to control the motion of a member whose movement is controlled by two hydraulically actuable elements as above, acting perpendicularly to one another but wherein a single hydraulic source and sump control the movement of the two cylinders or motors. An apportioning valve intermediate the source and the cylinders or motors selects the direction of movement of each cylinder, and the relative rates of movement of the two cylinders or motors, by proportioning the flow between them.

It is a particular object of this invention to apply the above device to the movement of a workpiece table relative to a cutting tool.

In the preferred embodiment of the invention is shown a workpiece table control for machine tools whereby the workpiece may be mounted on a table and moved relative to a cutting tool adapted to operate on the workpiece.

In drawings which illustrate an embodiment of the invention.

Figure 1:
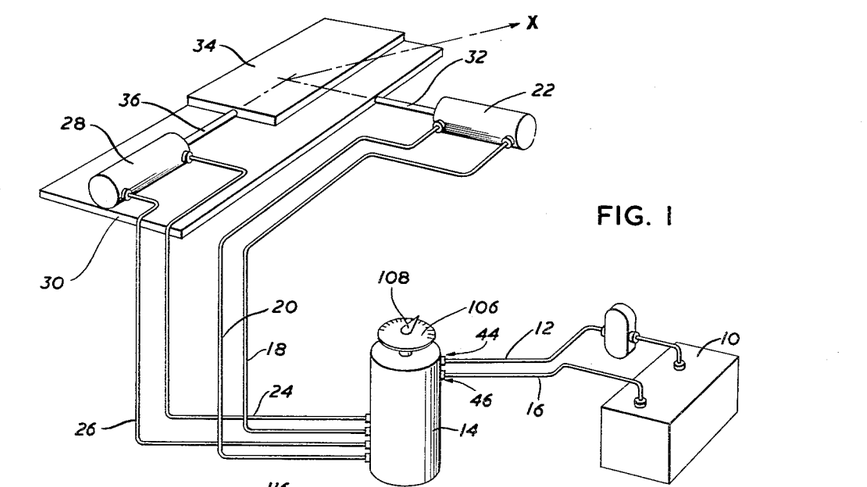
FIGURE 1 is a schematic view of a system utilizing the invention.

In FIGURE 1 is shown a hydraulic fluid source 10 for supplying hydraulic fluid under pressure along a main supply line 12 to an apportioning valve 14 while a main return or sump line 16 also connects the valve to the source 10. From the valve 14 a pair of lines 18 and 20 are connected to opposite ends of a reversible hydraulically actuable device, here a piston cylinder 22 and, as will be explained hereafter, each is adapted to act as a supply or as a return line depending upon the desired direction of movement of the actuable device (here the piston rod 32). Similarly, a pair of lines 24 and 26 are connected to opposite ends of a piston cylinder 28 each of which is adapted to act as a supply or as a return line depending on the desired direction of movement of piston rod 36.

Cylinder 22 is provided with a piston (not shown) and piston rod 32. Cylinder 22 is rigidly mounted on a base (not shown) and piston rod 32 is connected to a table 30 which is slidable on a base (not shown) in the desired direction of piston movement.

Cylinder 28 is fixedly mounted on table 30 and is provided with a piston (not shown) and a piston rod 36. The piston is connected to a workpiece table 34 slidably mounted on table 30 to move in the direction of movement of piston rod 36. Cylinders 22 and 28 are adapted to move rods 32 and 36 at right angles to one another.

The workpiece table may thus be made to move in the plane defined by the perpendicular directions of movement of tables 30 and 34 respectively. In this plane, any direction may be achieved by a proper combination of piston rod speeds and of piston rod sense which is achieved by valve 14 which apportions the supply fluid in line 12 between pairs of lines one selected from lines 18 and 20 and one selected from lines 24 and 26. The valve also simultaneously acts to connect the two of the four lines 18, 20, 24 or 26, which from time to time are not carrying supply fluid, to the return line 16.

Figure 2:
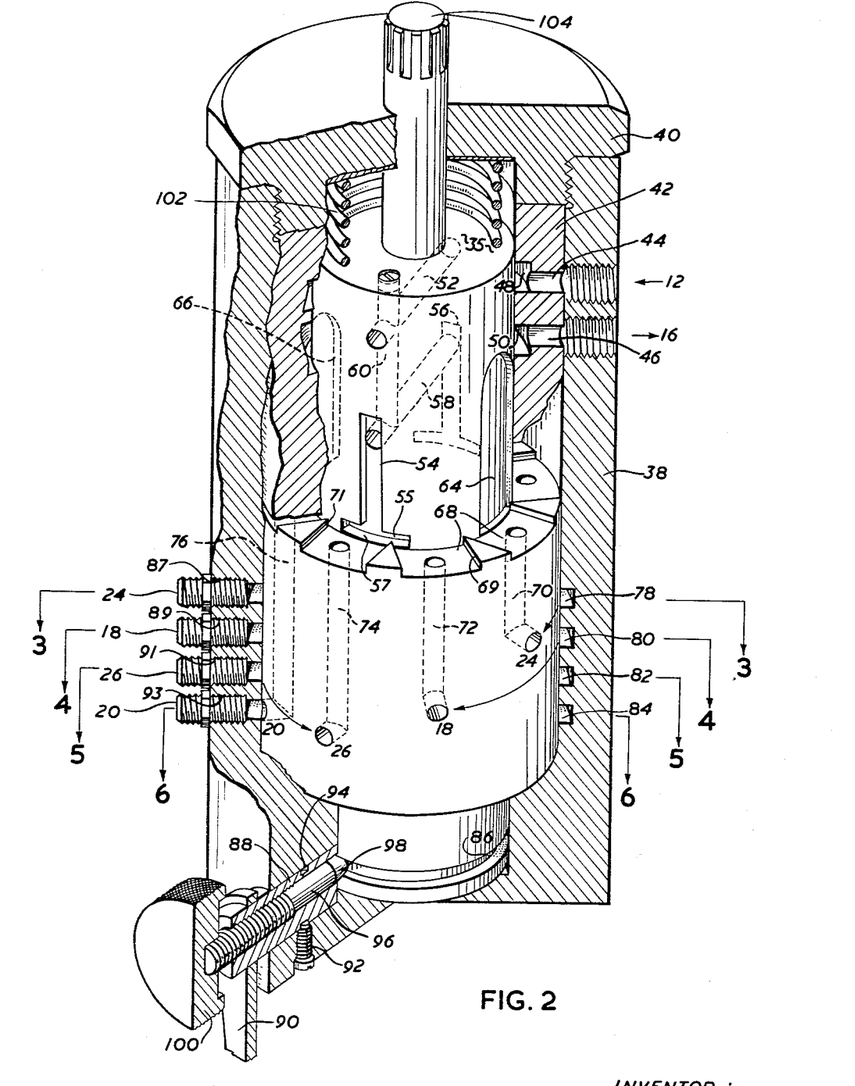
FIGURE 2 is a perspective, partially broken away, showing the proportioning valve.

In FIGURE 2 is shown the valve for apportioning the flow of oil from supply line 12 between one of lines 18 or 20 on the one hand and one of lines 24 or 26 on the other hand.

It will be understood that whichever of lines 18 or 20 is from time to time selected as the supply line, the other line will carry hydraulic fluid out of the cylinder. This is also true of lines 24 or 26. Thus the apportioning valve 14 is designed to connect the lines from time to time carrying fluid back from the cylinders to return line 16.

As seen in FIGURE 2 the valve 14 comprises a hollow cylindrical casing, the walls of the casing being made up of an outer shell 38 and an inner sleeve 42. The inner wall of the sleeve 42 defines a cylindrical bore to receive a rotatable block 35 having an exterior wall making a sliding fit with the sleeve 42 inner wall. In the specific embodiment shown the block 35 extends downwardly below the lower extent of sleeve 42 into a continuation of the bore in shell 38.

A port 44 is provided extending through shell 38 and sleeve 42 for connecting line 12 attached thereto to a groove 48 extending about the inner wall of sleeve 42.

A port 46 is provided extending through shell 38 and sleeve 42 for connecting line 16 attached thereto to a groove 50 extending about the inner wall of sleeve 42 and spaced from groove 48.

It will be seen that the groove 48 thus carries supply fluid from line 12 and the groove 50 returns fluid to line 16.

A passage 52 extends diametrically across block 35 at a height to be open at both ends to groove 48. A vertical passage 60 connects passage 52 to a cross passage 58. Cross passage 58 opens into diametrically opposed recesses 54 and 56 in the exterior wall of block 35 which recesses are downwardly spaced from grooves 48 and 50. It will be noted that it is unnecessary that passage 52 open to groove 48 at more than one location to hydraulically connect groove 48 with recesses 54 and 56.

Diametrically opposed recesses 54 and 56 each are in the shape of an inverted T when viewed radially inward of the block 35. The portion of the supply recess forming the upright of the T extends a relatively short distance circumferentially, and the free end of the upright extends upwardly to connect to the cross-passage 58. The portion of the supply recess forming the cross-bar 55 of the T extends a relatively longer distance circumferentially about the block 35 to subtend an angle of substantially one eighth of the block circumference for a purpose to be hereinafter discussed.

Diametrically opposed recesses 64 and 66 are also provided in the exterior wall of block 35 and adjacent their lower extremity have a width corresponding to that of cross-bar 55, or subtending an angle of substantially one-eighth of the block circumference. The lower defining edges of recesses 64 and 66 are at the same height as the lower defining edge of the cross-bar 55. The recesses 64 and 66 are 90 degrees offset from recesses 54 and 56 and thus the spacing between each end of a cross-bar 55 and the adjacent defining edge of a recess 64 or 66 is also an arc subtending one-eighth of the block circumference. Recesses 64 and 66 are extended upwardly to register with groove 50. The width of recesses 64 and 66 is maintained for the main part of this height and, for ease of machining recesses 64 and 66 terminate at their upper extremity in a convex upward semicircle.

Thus it will be seen that recesses 54 and 56 are always hydraulically connected to groove 48 and to supply line 12 and recesses 64 and 66 are always hydraulically connected to groove 50 and to return line 16.

The supply fluid available in recesses 54 and 56 is made available for supply to any of the four lines 18, 20, 24 and 26 which cause movement of each of the rods 32 and 36 in one of two directions. The selection of the lines is best illustrated in FIGURE 1a where the arrows indicate direction of travel of table 34 under the impulsion of fluid in the lines indicated used as supply lines.

Figure 1A:
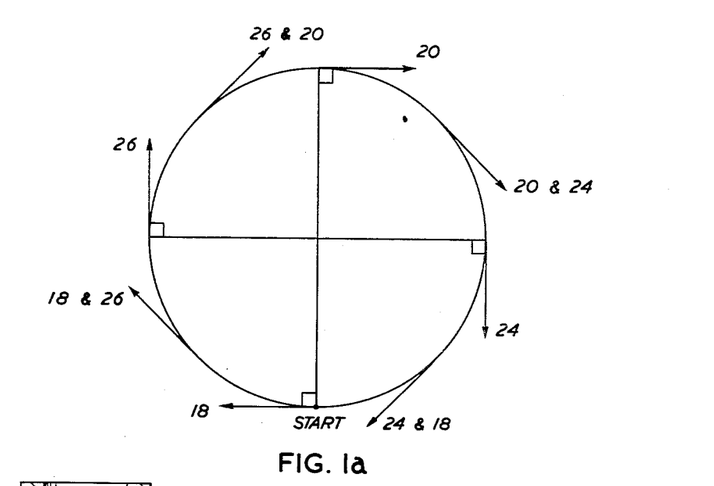
FIGURE 1a is a schematic view of the movement of a member under the control of two hydraulically actuable elements.

In FIGURE 1a is illustrated a circular track to be followed by a point selected on table 34. To travel through the full 360 degree range of possible directions it will be seen that at the starting position (which is arbitrarily chosen), only line 18 acts as a supply line and line 20 is the return, no supply or return fluid moving it either line 24 or line 26.

Then in sequence: the supply and return lines are:

| Supply | Return |
| --- | --- |
| lines 18 and 26 | lines 20 and 24. |
| line 26 only | line 24. |
| lines 26 and 20 | lines 24 and 18. |
| line 20 only | line 18 only. |
| lines 20 and 24 | lines 18 and 26. |
| line 24 only | line 26 only. |
| lines 24 and 18 | lines 26 and 20. | and finally at the starting position line 18 only is the supply line and line 20 acts as the return line. As the rotation of block 35 continues the sequence is repeated.

It will be seen that to obtain continuity of movement in any direction, the above sequence or the reverse sequence thereof must be followed.

Returning to FIGURE 2 then, the means connecting supply recesses 54 and 56 on the one hand and return recesses 64 and 66 on the other with the respective lines 18, 20, 24, 26 must allow connection in the above pattern or the reverse.

Shell 38 and sleeve 42, making up the casing, together define eight recesses 68 in the inside wall of sleeve 42. Recesses 68 are of a predetermined axial height and circumferential width. At the inner surface of sleeve 42 the vertical defining walls 69 for each recess 68 are immediately adjacent the nearer vertical defining wall 69 of the next aperture 68. This is achieved by providing that the vertical defining walls 69 meet in an edge 71 of very small radius in sliding relationship with said exterior wall of block 35. Moreover the recess at the inner surface of sleeve 42 is defined by parallel upper and lower edges perpendicular to the side defining edges which are parallel to the axis of the block 35. The height of recesses 68 corresponds, preferably, to the height of cross-bars 55.

Passages 72 connect the bases of a first pair of diametrically opposed recesses 68 to a circumferential channel 80 which in turn connects through outlet port 89 to line 18.

Passages 74 connect the bases of a second pair of diametrically opposed recesses 68 to a circumferential channel 82 which in turn connects through port 91 to line 26. The recesses 68 connected to line 26 are located one step clockwise from those connected to line 18.

Passages 76 connect the bases of a third pair of diametrically opposed recesses 68 to a circumferential channel 84 which in turn connects through port 93 to line 20. The recesses 68 connected to line 20 are located one step clockwise from those connected to line 26.

Passages 70 connect the bases of a fourth pair of diametrically opposed recesses 68 to a circumferential channel 78 which in turn connects through port 87 to line 24. The recesses 68 connected to line 24 are located one step clockwise from those connected to line 20 and one step counterclockwise from those recesses connected to line 18.

Thus it will be seen that as a supply recess 54 or 56 rotates clockwise it will supply fluid in the sequence set out above and that at any time the return recesses 64 or 66 are simultaneously located to receive return fluids from the lines carrying it at the same step in the sequence.

Thus in the position shown in FIGURE 2 the supply recess 54 shown is connected to lines 18 and 26 as is the diametrically opposed supply recess 56. At the same time the return recesses 64 and 66 are connected, in the same respective proportional arrangement to lines 20 and 24.

It will be seen that, ideally, recesses 68 each form one-eighth of the circumference of the inner wall of sleeve 42 and thus the angle subtended by a recess 68 is substantially that subtended by a block recess 64 or 66 or by a cross-bar 55. It is however preferable that the block recesses and cross-bar 55 be wide enough to encompass the width of a recess 68 and the width of the contacting edges 71 on each side thereof. Therefore when a recess 64 or 66 or cross-bar 55 is spoken of as being "substantially one-eighth of the block circumference," it will be understood that what is meant is a width equal to that of a recess 68 and of the contacting recesses 71 on either side.

Thus it will be seen that if the block 35 rotates at a uniform rate clockwise, the table (FIGURE 1 and FIGURE 1a) will describe substantially a circle subject to a small deviation discussed in column 6, lines 50 to 76. If the block 35 is maintained stationary in any selected position the table will move in a straight line which may be in any direction determined by such selected position.

Reversal of the direction of rotation of block 35 will cause the table to describe a curve of the opposite sense as would a complete reversal of the order of connection of lines 24, 18, 26 and 20 to ports 87, 89, 91 and 93.

It should also be noted that it is not necessary that there be eight recesses 68. The number of recesses 68 must be 4, 8, 12 or other multiple of 4.

Moreover it is not necessary that there be one supply recess, or one return recess for each four recesses 68. It is necessary that all supply recesses simultaneously register with recesses 68 connected to the same pair of lines consecutively selected from the group 24, 18, 26 and 20 (or the reverse cycle) and that the return recesses register with recesses 68 connected to lines from the above group not connected to supply recesses.

With eight recesses 68 as shown it will be seen that a rotation of 45 degrees of block 35 will cause a 90 degree change of direction of table 34 and a rotation of 90 degrees of block 35 will reverse the direction of table 34. If twelve recesses 68 were provided then a rotation of 30 degrees and 60 degrees of block 35 would cause, respectively, a 90 degree and 180 degree change of direction of table 34 and a similar calculation may be made whatever is the number of recesses 68 which must always be a multiple of four.

The holes 68 are defined by horizontal upper and lower surfaces and, in the position shown in FIGURE 2 register with the lower portion of recesses 64 and 66 or with the cross-bars 55 of recesses 54 and 56. Which holes 68 are opposite which recesses or cross-bars depends, of course, upon the relative orientation.

Provision is made for altering the height of block 35 for a purpose to be later described. The means for altering the block height is covered by U.S. Patent 2,903,233 issued September 8, 1959 to Retor Developments Limited. The block 35, near its lower end, is provided with a circumferential shoulder 86. The casing is bored radially opposite the shoulder to house rotatably with a sliding fit a stud 88. The stud has a handle 90 outside the casing, for manual operation. A set screw 92 projects radially into the bore and rests in a groove 94 in the stud 88 to maintain it in position. Extending longitudinally through an axial bore in the stud 88 and threaded therein is a shank 96 having an inwardly tapered end 98 which projects beneath the shoulder 86 to support the block. The shank 96 is eccentrically mounted in the stud 88. Coarse control of the block height is achieved by rotation of the stud 88 by the handle 90. Fine control of the block height is achieved by rotation of shank 96 by a suitable handle 100. Such rotation alters the diameter of the portion of the tapered shank end 98 which supports the block 35. The block height in turn controls the registration between block recesses 54, 56, 64 and 66 and body recesses 68.

The stud 88 is, in FIGURE 2, oriented so that the shank 96 is approaching its highest position. Thus the block 35 is, subject also to the fine adjustment of tapered shank end 98, also approaching its highest position providing in the position shown in FIGURE 2 for the vertical registration between cross-bar and a recess 68. It should be noted that while in FIGURE 2, the cross-bars 55 are not in circumferential registration with any one recess 68, the views of FIGURE 2a and 2b show the block 35 rotated to a position where such circumferential registration exists.

It is desirable to provide for a smaller oil flow than that allowed by the full registration of recesses 68 with cross-bars 55 and also for complete shut-off. Such adjustment is possible since the stud may be oriented to move shank 96 and block 35 above the position for full registration of cross-bars 55 and recesses 68. Such partial registration is best illustrated in FIGURE 2c which is an enlarged view of the elements shown in FIGURES 2a and 2b.

In some operations it will be desirable to move the table 34 only over either of the mutually perpendicular directions defined by piston rods 32 and 36. In such operations it may be desirable to allow for considerable margin of setting of the pointer 108 without allowing the orientation of block 35 to vary the flow of oil which, in this mode of operation is all to the cylinder controlling rod 32 or all to the cylinder controlling rod 36. To operate the proportioning valve and the system in this manner the stud 88 is rotated 180 degrees by handle 90 to move the block 35 downward relative to sleeve 42. This results in the cross-bar 55 moving downward and out of registration with the holes 68 to the position illustrated in FIGURE 2b. In this position the narrow upright of a recess 54 or 56 registers with a hole 68 sending all supply oil to the line 24, 18, 26 or 20 corresponding to the registering recess 68.

Figures 2A, 2B, 5, 6:
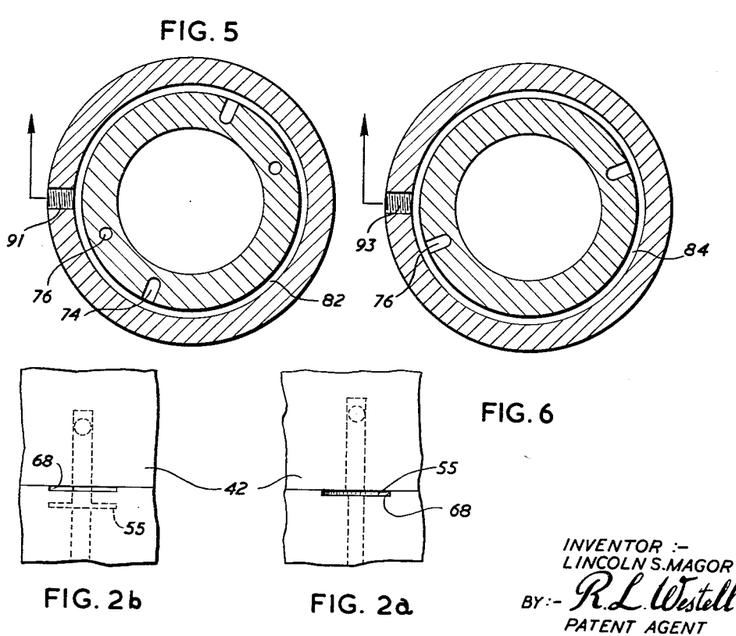
FIGURE 2a is a view of a part of the valve.
FIGURE 2b is a view of the elements shown in FIGURE 2a in a different position to that shown in the preceding view.
FIGURES 3–6 are cross-sections along the lines 3—3 to 6—6 respectively of FIGURE 2.
Figure 2C:
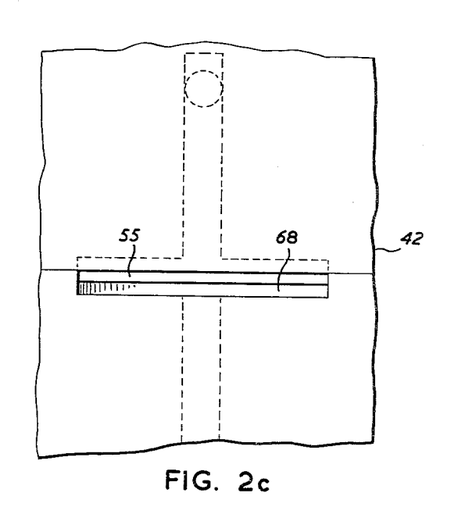
FIGURE 2c is an enlarged view of the elements of FIGURES 2a and 2b in a different relationship.
Figures 3, 4:
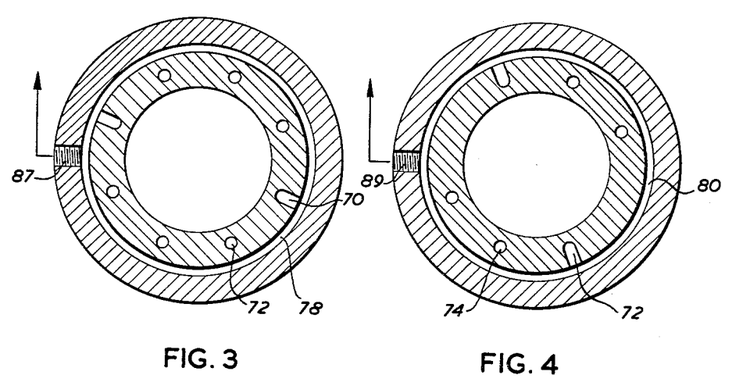

Thus as will be seen from FIGURE 2b the block 35, (and hence pointer 108) may be varied a reasonable amount without destroying the registration between the narrow upright of recess 54 and 56 and the selected aperture 68.

Due to the provision for the lower position of block 35 (corresponding to FIGURE 2b) care must be taken in design of the valve that the hydraulic connections to supply groove 48 and return groove 50 are not interfered with. (See FIGURE 2.) Thus the height of groove 48 must be sufficient to register with passage 52 in both positions of block 35; and similarly the height of groove 50 must be adequate to register with recesses 64 or 66 in both block positions. Conversely the lower edge of groove 48 must be high enough to stay out of register with recesses 64 or 66 in the higher position of block 35; and the upper edge of groove 50 must be low enough to avoid registration with passage 52 in the lower position of block 35.

The block is maintained against any tendency to "float" by compression spring 102 bearing at its upper extremity on the cap 40 and at its lower extremity on the block 35. Suitable washers (not shown) may be placed at each end of the compression spring 102 to ensure that the spring does not frictionally impede the movement of the block 35.

Rotational control for the block is provided for by a shaft 104 projecting upwardly therefrom through an aperture in cap 40.

The upper surface of the lid 40 may be provided with a scale 106 (see FIGURE 1) to operate with a setting pointer 108 mounted on the shaft to provide manual control of the table direction.

It should be noted that although with the valve shown in FIGURE 2, a 45 degree rotation of block 35 will cause a 90 degree change of direction of table 34, a rotation of other than multiples of 22½ degrees of the valve will not cause a proportional change of table movement. Thus if the valve is in position to send all the supply fluid to the cylinder to move the table in direction A, and the valve is rotated 7.5 degrees it would be expected that the table direction would be altered a proportional amount, i.e. 15 degrees. However, it will be seen that when the valve is rotated 7.5 degrees, $$\frac{7.5}{45}$$

or ⅙ of the fluid from supply line 12 is acting to move the table in a direction perpendicular to direction A and $$\frac{37.5}{45}$$

or ⅚ of the fluid from supply line 12 is acting to move the table in a direction parallel to direction A. Thus, since the speeds in the component directions are proportional to the fluid flow, the table is moving at an angle to direction A which is the angle whose tangent is ⅕ or .20. This angle is about 11.31 degrees.

Similar calculations may be made for each orientation of valve versus table.

Similar calculations may be made if the valve rotation direction to table orientation rotation is altered by providing 4, 12, 16 or more recesses 68 instead of 8.

These calculations must be taken into account when using the embodiment of the system shown in FIGURE 1. While it is possible to design mechanically or hydraulically to provide a valve whose angular rotation is linearly related to the change of orientation of the table, the simplest method is to calibrate scale 106 to indicate the alteration in table direction. Thus scale 106 will not be angularly proportional but will indicate the settings for the desired table direction. Thus the path described by table 34 in response to uniform rotation of block 35 will be slightly non-circular but will oscillate across the true circular path.

It will be understood that the control system is equally applicable to hydraulic motors of the type wherein a reversal of the supply and exhaust lines reverses the direction of movement of the motor.

Figure 7:
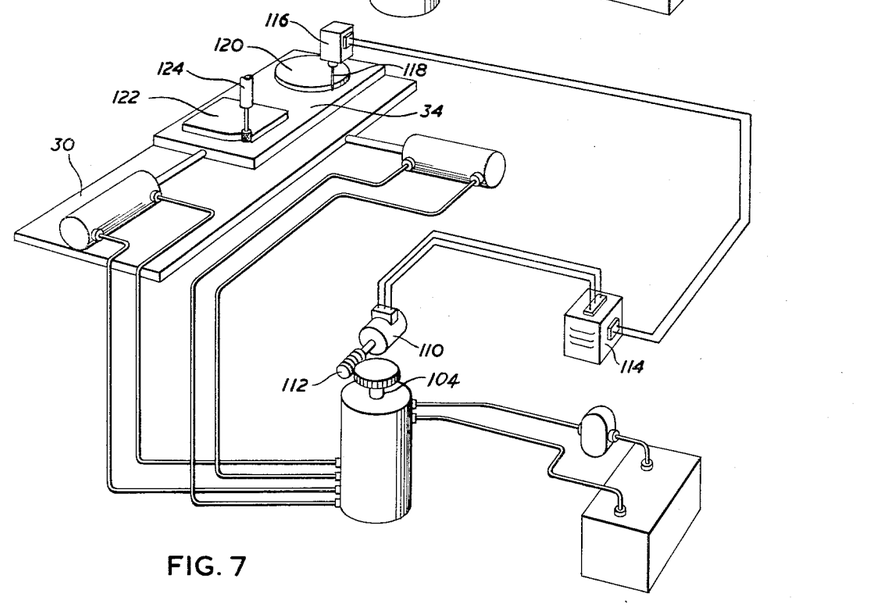
FIGURE 7 is a system in accord with the invention being an alternative to that shown in FIGURE 1.

In FIGURE 7 is also shown an automatic machine tool control system incorporating applicant's proportioning valve. An electric motor 110 through a worm gear 112 drives the shaft 104 at a controllable speed which with the consequent rotation of the block 35 causes the table 34 to move through a curve similar to that of FIGURE 1a except for the deviation discussed at column 6, lines 50–74 whose radii vary inversely as the speed of rotation of the block 35. The motor 110 is reversible and has a three-wire connection to a supply 114. The supply is controlled by a control box 116 from which a stylus 118 acting as a sensing element projects to contact and trace about a pattern or model 120 fixed on table 34. Control between box 116 and box 114 and/or between box 114 and shaft 104 may be hydraulic or pneumatic as well as electric within the scope of the invention.

The power supply 114 and control box 116 are so arranged that when the stylus is undeflected the supply 114 causes the motor 110 to rotate the block in a given direction at a predetermined speed. The speed is adapted to give to the table 34 turning radii less than any radius in the pattern 120 to be traced. The table will also mount a workpiece 122 to be machined located below a machining tool 124 which machines the workpiece in accord with pattern 120. Thus the stylus will, by the narrow turning radius of table 34 movement, be continuously brought into contact with the model. The control box 116 and power supply 114 are so arranged that deflection of the stylus 118 (at the level of the model of the order of thousandths of an inch), will in proportion to the stylus 118 deflection, cause the motor to slow down, stop or reverse, that is will algebraically reverse the normal rotation direction moving the table about a greater radius, a straight line or a radius of the opposite sense, until the stylus 118 is again undeflected when the table will continue about its original radius. The stylus is therefore continually biased to the undeflected position.

These states of rotation will alternate throughout the machining of a workpiece in accord with the model and it will be seen that the deflection of the stylus to cause a reversal represents the tolerance of the machined part.

Since deflection of the stylus 118 in any direction will cause a change of curvature of table 34 movement in one direction, it will be appreciated that if the stylus 118 meets the surface of the model in the wrong sense, the deflection of the stylus will cause the cutting tool 124 to move toward instead of away from the model and machine part respectively. It will be seen that the stylus and the contour of the model must for correct operation meet when the radius of curvature of stylus movement intersects the model contour rather than extending away from it. For this and other safety reasons, the stylus is connected to shut off the hydraulic supply to the cylinders 22 and 28 on deflection to a certain maximum amount.

Figure 8:
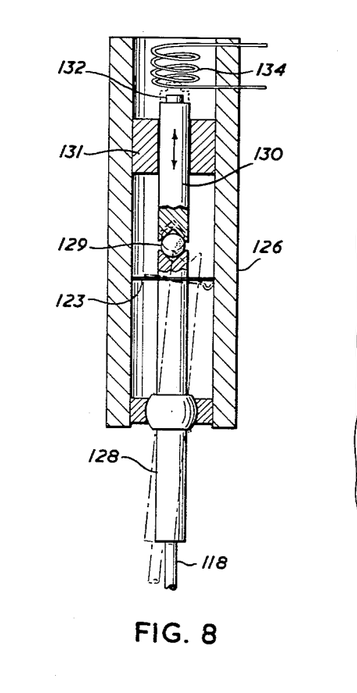
FIGURE 8 is an element of the system shown in FIGURE 7.

The design of box 116 must provide that stylus deflection in any direction will, up to a predetermined amount, create a signal, for transmission to box 114, the signal being proportional to the angle of deflection of the stylus from the vertical but independent of the direction of deflection. This may be done in any of a number of ways for example the means shown in FIGURE 8. In FIGURE 8 is shown a housing 126. A shank 128 mounting a stylus 118 is universally mounted in the housing so that the stylus projects downwardly therefrom and a portion of the shank 128 projects above the universal mounting. A means is provided for normally centering the shank in the housing so that the stylus hangs vertically when undeflected by the model 120 here shown as a resilient diaphragm 123. The upper end of shank 128 is conically recessed to support a ball 129 therein. The ball in turn supports a shank 130 conically recessed downwardly to receive the ball. The shank 130 is maintained against lateral movement by a guide sleeve 131 mounted in the housing. At the upper end of shank 130 is a magnetic core element 132 located so that when moved vertically it affects the reluctance of a magnetic coil 134 mounted on the housing and connected at its ends to the box 114. The device operates as follows: when the stylus 118 is undeflected by the contour of model 120 the signal through coil 134 is constant at a value to cause box 114 and motor 110 to rotate block 35 at a rate to keep the table turning on a small radius moving model 120 towards the stylus 118. When model 120 contacts the stylus 118 the latter is deflected, deflecting shank 128 and through the interaction of the two conical recesses or the ball 129 raises shank 130. The core element 132 is raised altering the reluctance of coil 134 whereby box 114 causes the motor 110 to decrease in speed, stop or reverse. The same changes occur in the motion of the block 35 whereby the model 120 is again moved away from the stylus 118. As the stylus 118 resumes vertical position the magnetic reluctance of the coil 134 returns to normal due to the movement of the magnetic element 132 to its original position. Thus the block 35 is again rotated at its original speed again moving the stylus 118 towards the model 120. It will be realized that the movement of the stylus 118 along the contour of the model corresponds to the movement of the cutting tool 124 cutting out of the workpiece 122 a facsimile of the model.

The slopes of the conical recesses on the one hand and the electronic circuit handling the signal from coil 134 on the other may be designed so that the amount of change in rotational speed of block 35 is proportional to the deflection of the stylus from the vertical. Thus the radius of movement of table 34 varies as the deflection and it will be understood that the radius of movement will go through infinite value and to opposite sign as the block 35 stops and reverses.

The shutting off of the hydraulic fluid supply on excessive deflection of the stylus 118 may be accomplished by a limit switch attached to the housing 126 or by design of the box 114 to achieve such action on reception of an excessive error signal from coil 134.

The model or pattern 120 is shown, in FIGURE 7, attached to table 34. It is necessary that the model or pattern 120 move in conjunction with table 34 for movement in the plane defined by rods 32 and 36. However, it is not necessary that the model be physically placed on the table 34; and it will be understood that variants of the construction shown where the model moves in conjunction with the table, are within the scope of the invention.

I claim:

1. At least two hydraulically actuable elements, each adapted to control a different direction of movement of a body, a pair of hydraulic lines to each of said elements, either line of a pair being adapted to act either as a supply line while the other acts as an exhaust line or vice versa, said actuating elements being of the type where the sense of movement is reversible and is determined by which of said lines is the supply and which the return line; an hydraulic fluid source provided with a source supply and a source return line, a valve connected and constructed to distribute hydraulic fluid flowing along said source supply line between two lines being: either line of one of said pairs and either line selected from the other of said pairs in proportions continuously and simultaneously variable between substantially 0% and substantially 100% to the line of said one of said pairs and substantially 100% to substantially 0% to the line of said other of said pairs whereby an increase of the proportion of hydraulic fluid to one of said two lines is simultaneous with a substantially corresponding decrease of the proportion of hydraulic fluid flowing to the other of said two lines and vice versa, said valve operating in conjunction with means for simultaneously hydraulically connecting the other line of each of said selected pairs to said source exhaust line, whereby the component of speed of said body in the directions corresponding to said selected lines is controlled by said apportionment, said variable apportioning means including means for variably controllably selecting which of each of said lines of a pair is connected to said supply thereby determining the sense of movement of said elements.

2. Means controlling the movement of a body, comprising: a main supply line for hydraulic fluid, a main return line for hydraulic fluid, a first hydraulically actuable member reversibly controlling the movement of said body in one direction, a second hydraulically actuable member reversibly controlling the movement of said body in another direction, said directions being mutually perpendicular, a pair of hydraulic lines connected to each said actuable member, the design of said actuable members being such that the choice of one line of a pair as the supply line of the member determines the sense of movement of the member, first and second valve components relatively rotatable with respect to one another, said first valve component being provided with means for connecting said main supply and said main return lines to a predetermined number of supply recesses and said predetermined number of return recesses respectively, all said supply and return recesses being of substantially equal circumferential length at a predetermined location about said axis of rotation, said recesses being located in a cylindrical wall of said first valve component, said supply and return recesses alternating with one another about said circumference and being spaced from each other by a circumferential length equal to the length of a recess; a second valve component relatively rotatable with respect to said first valve component, provided with a cylindrical wall adapted to move in sliding relationship to said first component; a number of recesses, being four times said predetermined number located circumferentially about said second component cylindrical wall, said second component recesses being divided by edges in sliding relationship to said first component cylindrical wall and being arranged, during rotation of said first valve component relative to said second valve component, to register with said supply and return recesses, said second component recesses about said circumference being sequentially connected to: one line to said first actuable member, one line to said second actuable member, the other line to said first actuable member, the other line to said second actuable member, said one line to said first actuable member, and so on; means for rotating said first valve component relative to said second valve component whereby hydraulic fluid from said main supply acts to move said two actuable members in directions and at relative rates determined by the registration of said first component recesses with said second component recesses.

3. Means for supplying hydraulic fluid under pressure, a main supply line and a main return line for hydraulic fluid connected to said means, a first valve component having a surface defining a predetermined reversible direction of relative movement, at least one pair of recesses in said surface, said main supply and main return lines being connected respectively to said recesses, said portions of said recesses having equal width measured in said direction of movement, the adjacent defining edges of said portions being spaced by an equal extent, a second valve component having a surface adapted to slide relative to said first component surface in said direction, a multiple of four recesses in said second component surface aligned in said direction, said recesses being immediately adjacent one another and of substantially the same width as said first member recesses, alternate second member recesses being connected to opposite ends of a hydraulically actuable element for controlling movement of a body in one direction and alternate second member recesses being connected to opposite ends of a hydraulically actuable element for controlling movement of said body in another direction, means for reversibly moving said valve component members relative to one another.

4. A hydraulic control valve comprising a rotatable component, means connecting a hydraulic supply to at least one recess in a cylindrical surface of said rotatable component which is concentric about the rotation axis, means connecting at least one recess in said cylindrical surface to an hydraulic sump, at stationary component having a surface adapted to make close sliding contact with said rotatable component cylindrical surface as it rotates, a multiple of four recesses in said stationary component being adapted to register with said rotatable member recesses, said last named recesses being defined by defining walls meeting at inner edges making sliding contact with said rotatable member, the width of said rotary member recesses being substantially the same and substantially the same as the width of each of said stationary member recesses, said supply recesses being spaced from said return recesses by a distance equal to an odd number of stationary member recesses, means for connecting said stationary recesses to hydraulic lines.

5. A valve as claimed in claim 4 in combination with two hydraulically actuable devices adapted to control the movement of a body along different directions, each of said actuable devices being reversible and each being controllable in a direction by a pair of hydraulic lines each of which is adapted to act as a supply or as a return line, means hydraulically connecting every fourth stationary member recess to one line to one of said actuable devices, every fourth stationary member recess adjacent thereto being connected to one line to the other of said actuable devices, every fourth stationary member recess adjacent a last mentioned recess being connected to the other line of said one of said actuable devices, every fourth stationary member recess adjacent a last mentioned recess being connected to the other line of said other of said actuable devices, and means for controlling the rotation of said rotatable member.

6. A device as claimed in claim 5 wherein means are provided for reversibly causing said relative rotation, said means being controlled by a sensing element having a normal and a deflected position and biased toward the normal position and designed when in the normal position to cause relative rotation in a given direction at a predetermined speed and when deflected a predetermined degree to algebraically reduce said speed in proportion to the deflection of said sensing element.

7. A device as claimed in claim 6 wherein said sensing element is designed when deflected a predetermined amount larger than said predetermined degree to disconnect said hydraulic supply from said hydraulically actuable device.

8. A device as claimed in claim 3 wherein said relatively movable valve component surfaces are concentric cylinders and said relative movement is rotary.

9. For use with a hydraulic control for a body wherein a pair of hydraulically actuable devices are connected respectively to move said body in a direction, said directions being mutually perpendicular, a pair of lines to each of said actuable devices, each line of said pair being adapted to act as a supply or as a return line, the selection of one of said lines as a supply line determining the sense of movement in which the respective device moves said body; a distributing valve for connection to a hydraulic fluid supply and a hydraulic fluid return line, said valve comprising: a hollow casing having a wall defining a cylindrical bore therein, a block rotatably mounted in said casing having an exterior wall adapted to move in sliding relationship to said bore defining wall; means defining a multiple of four recesses in the surface of said bore defining wall circumferentially spaced therearound, said recesses being of predetermined axial height and circumferential width and being separated from one another by walls having axial edges in sliding relationship to said block exterior wall, the upper and lower edges defining said recesses being horizontal; means for connecting said casing recesses to said hydraulic devices said casing recesses around the casing being connected to said devices in the following sequence:

to a first end of one of said hydraulic devices,
to a first end of the other of said hydraulic devices,
to the second end of said one of said hydraulic devices,
to the second end of said other of said hydraulic devices,
to said first end of said one of said hydraulic devices, and so on;

means defining at least one supply recess in said exterior wall, said supply recess being shaped to provide a first portion with a circumferential length equal to the circumferential length of a casing recess, the first portions of said supply recesses being spaced about said circumference so that all will simultaneously register with recesses connected to the same end of the same hydraulic device; means defining at least one return recess in said exterior wall having a circumferential length equal to the length of one of said casing recesses and of a height to register therewith, said return recesses being spaced about said circumference so that all will simultaneously register with recesses connected to the same end of the same hydraulic device and that the hydraulic lines to which said return recesses are connected are opposite to those to which said supply recesses are simultaneously connected; means for connecting a hydraulic fluid supply to said block supply recesses; means for connecting a hydraulic fluid sump to said block return recesses; means for rotating said block relative to said casing.

10. A valve for use with a hydraulic control as claimed in claim 9 wherein said means defining each said supply recess defines a second portion extending axially from said first portion, said second portion being substantially narrower in a circumferential direction than said casing recess circumferential length, means, for vertically displacing said block relative to said casing whereby said first portions of said supply recesses are moved out of register with said casing recesses and said second portions into register with said casing recesses and wherein said return recesses are of a height to register with said casing recess in either relative position of said block and casing.

11. A valve comprising: a hollow casing having a wall defining a cylindrical bore therein; a block rotatably mounted in said casing having an exterior wall adapted to move in sliding relation to said bore defining wall; means defining a multiple of four recesses in the surface of said bore defining wall circumferentially spaced therearound, said recesses being of predetermined axial height and circumferential width and being separated from one another by walls having axial edges in sliding relationship to said block exterior wall, the upper and lower edges defining said recesses being horizontal; means defining at least one supply recess in said exterior wall, said supply recess being shaped to provide a first portion with a circumferential length equal to the circumferential length of a casing recess, said supply recesses being spaced about said circumference so that all will simultaneously register with casing recesses spaced by $4n-1$ casing recesses and $n$ is an integer; means defining at least one return recess in said exterior wall having a circumferential length equal to the length of one of said casing recesses and of a height to register therewith said return recesses being spaced about said circumference so that all will simultaneously register with casing recesses spaced by $4n-1$ casing recesses and $n$ is an integer and that the hydraulic lines to which said return recesses are connected are spaced from those to which said supply recesses are simultaneously connected by $4n+2$ casing recesses where $n$ is an integer; means in said block and said casing allowing hydraulic fluid to be supplied to said supply recesses; means in said block and said casing allowing hydraulic fluid to be received from said return recesses; means for rotating said block relative to said casing; and means for connecting hydraulic lines to each of said casing recesses.

12. A valve as claimed in claim 11 wherein said means defining each said supply recess defines a second portion extending axially from said first portion, said second portion being substantially narrower in a circumferential direction than said casing recess circumferential length, means, for vertically displacing said block relative to said casing whereby said first portion of said supply recesses are moved out of register with said casing recesses and said second portions into register with said casing recesses and wherein said return recesses are of a height to register with said casing recess in either relative position of said block and casing.

13. For use with a hydraulic control for a body wherein a pair of hydraulically actuable devices are connected respectively to move said body in a direction, said directions being mutually perpendicular, a pair of lines to each of such actuable devices, each line of said pair being adapted to act as a supply or as a return line, the selection of one of said lines as a supply line determining the sense of movement in which the respective devices move said body; a distributing valve for connection to a hydraulic fluid supply and a hydraulic fluid return line, said valve comprising: a hollow casing having a wall defining a cylindrical bore therein, a block rotatably mounted in said casing having an exterior wall adapted to move in sliding relationship to said bore defining wall; means defining a multiple of four recesses in the surface of said bore defining wall circumferentially spaced therearound, said recesses being of predetermined axial height and circumferential width and being separated from one another by walls having axial edges in sliding relationship to said block exterior wall, the upper and lower edges defining said recesses being horizontal; means for connecting said casing recesses to said hydraulic devices, said casing recesses around the casing being connected to said devices in the following sequence; to a first end of one of said hydraulic devices, to a first end of other of said hydraulic devices, to the second end of said one of said hydraulic devices, to the second end of said other of said hydraulic devices, to said first end of said one of said hydraulic devices, and so on; means defining at least one return recess in said exterior wall, said return recess being shaped to provide a first portion with a circumferential length equal to the circumferential length of a casing recess, the first portions of said return recesses being spaced about said circumference so that all will simultaneously register with recesses connected to the same end of the same hydraulic device; means defining at least one supply recess in said exterior wall having a circumferential length equal to the length of one of said casing recesses and of a height to register therewith, said supply recesses being spaced about said circumference so that all will simultaneously register with recesses connected to the same end of the same hydraulic device and that the hydraulic lines to which said supply recesses are connected are opposite to those to which said return recesses are simultaneously connected; means for connecting a hydraulic fluid supply to said block return recesses; means for connecting a hydraulic fluid sump to said block supply recesses; means for rotating said block relative to said casing.

14. A valve for use with a hydraulic control as claimed in claim 13 wherein said means defining each said return recess defines a second portion extending axially from said first portion, said second portion being substantially narrower in a circumferential direction and said casing recess circumferential length, means, for vertically displacing said block relative to said casing whereby said first portions of said return recesses are moved out of register with said casing recesses and said second portions interregister with said casing recesses and wherein said return recesses are of a height to register with said casing recess in either relative position of said block and casing.

15. A device as claimed in claim 8 wherein means are provided for reversibly causing said relative rotation, said means being controlled by a sensing element having a normal and a deflected position and designed when in the normal position to cause relative rotation in a given direction at a predetermined speed and when deflected to algebraically reduce said speed in proportion to the deflection of said sensing element.

16. A device as claimed in claim 15 wherein said sensing element is designed when deflected a predetermined amount larger than said predetermined degree to disconnect said hydraulic supply from said hydraulically actuable device.

17. A system for controlling, in two dimensions, the movement of a body, in accord with the contour of a model movable in conjunction with said body; comprising a pair of hydraulically actuable elements each connected to reciprocally move the body in a direction whereby the two directions define a plane of movement for the body, first and second hydraulic lines to one of said elements, third and fourth hydraulic lines to the other of said elements, any one of said lines to an element being adapted to act as a supply line while the other line to the same element acts as an exhaust line, said elements being so designed that the selection of one line to one of said elements as a supply line moves said element in one sense and the selection of the other line to said one of said elements moves said element in the opposite sense, an hydraulic fluid source provided with a source supply line and a source return line, means for distributing fluid flowing along said source supply line between said lines to said elements, cyclically in the following, reversible, sequence:

to said first line
to said first and third lines
to said third line
to said third and second lines
to said second line
to said second and fourth lines
to said fourth line
to said fourth and first lines
to said first line, and so on;

said distributing means being so designed that when supply fluid is being distributed to a pair of lines, the proportion is continually changing whereby the supply to one line is continually increasing and the supply to the other line is continually decreasing, whereby the direction of movement of the body is continually altering in accord with the sense of movement of the respective hydraulic elements and the relative speeds.

18. A system as claimed in claim 17 wherein means are provided for controlling said sequence, said means being controlled by a sensing element located in proximity to said model contour, said sensing element being adapted to be undeflected when out of contact with said model contour and to be deflected by said model contour when in contact therewith, said sensing element control being constructed and connected when in said normal position to cause said distributing means to move cyclically, through said sequence at a predetermined rate, and when in said deflected position to algebraically reduce said speed in accord with the deflection of said sensing element whereby with increasing deflection movement of said distributing means through said sequence will decrease until movement is halted and on further deflection such sequence will be reversed.

19. A system as claimed in claim 18 wherein said sensing element is constructed and connected when deflected a predetermined degree after such reversal to interrupt the flow of supply fluid to said hydraulically actuable elements whereby movement of said hydraulically actuable elements and movement of said body is halted.

20. A system for controlling, in two dimensions the movement of a body in accord with the contour of a model movable in conjunction with said body comprising a pair of hydraulically actuable elements, each connected to reciprocally move the body in a direction whereby the two directions define a plane of movement for the body, means for supplying hydraulic fluid to and receiving hydraulic fluid from said hydraulic elements to cause said elements to move said body, apportioning means for causing said fluid to be reversibly sequentially supplied to said hydraulic elements in such continually varying proportions that said body follows a curved path, means for controlling said apportioning means and thereby the radius of said curved path, said means being controlled by a sensing element located in proximity to said model contour said sensing element being adapted to be undeflected when out of contact with said model contour and to be deflected by said model contour when in contact therewith, said sensing element control being constructed and connected when in said normal position to cause said apportioning means to supply fluid to said lines in one sequence at a predetermined rate and when in said deflected position to algebraically reduce said rate in accord with the deflection of said sensing element whereby with increasing deflection said rate will decrease until said sequence is reversed.

21. A system as claimed in claim 20 wherein said sensing element is constructed and connected when deflected a predetermined degree after such reversal to interrupt the flow of supply fluid to said hydraulically actuable elements whereby movement of said hydraulically actuable elements and movement of said body is halted.

22. A system for controlling, in a plane the movement of a body in accord with the contour of a model movable in conjunction with said body, comprising: a hydraulic source, a main supply line and a main return line for hydraulic fluid connected to said source, a first valve component having a cylindrical surface, at least one pair of recesses in said surface, said main supply and main return lines being connected respectively to said recesses, said portions of said recesses having equal width measured in said direction of movement, the adjacent defining edges of said portions being spaced by an equal extent; a second valve component having a cylindrical surface adapted to slide on said first component surface in said direction, a multiple of four recesses in said second component surface aligned in said direction, said recesses being immediately adjacent one another, the distance between adjacent walls of alternate second component recesses being substantially the width of the first member recesses, alternate second member recesses being connected to opposite ends of a hydraulically actuable element connected to control movement of said body in one direction in said plane and alternate second member recesses being connected to opposite ends of a hydraulically actuable element for controlling movement of said body in another direction in said plane, means for reversibly rotating said valve component members relative to one another, said rotating means being controlled by a sensing element located in proximity to said model contour, said sensing element being constructed and connected to be undeflected when out of contact with said model contour and to be deflected by said model contour when in contact therewith, said sensing element control being constructed and connected when in said normal position to cause said rotating means to relatively rotate said valve component in one direction at a predetermined rate and when in said deflected position to algebraically reduce said rate in accord with the deflection of said sensing element whereby with increasing deflection said rate will decrease until said sequence is reversed.

23. A system as claimed in claim 22 wherein said sensing element is adapted when deflected a predetermined degree after such reversal to interrupt the flow to said hydraulically actuable elements whereby movement of said hydraulically actuable elements and movement of said body is halted.

References Cited in the file of this patent

UNITED STATES PATENTS

| | | |
|---|---|---|
| 2,589,204 | Parsons | Mar. 11, 1952 |
| 2,675,652 | Chiappulini | Apr. 20, 1954 |
| 2,911,182 | Clarke et al. | Nov. 3, 1959 |